Patented Oct. 4, 1938

2,132,064

UNITED STATES PATENT OFFICE 2,132,064

TREATED LATEX AND METHOD OF TREATING LATEX

Clarence W. Wilson, Corona, Calif., assignor to California Fruit Growers Exchange, Los Angeles, Calif., a corporation of California No Drawing. Application April 1, 1935, Serial No. 14,124

17 Claims. (Cl. 18—50)

This invention relates to a method of creaming rubber latex, and more particularly to the creaming of fresh latex.

Latex, that is, for example, the secretion of the hevea or rubber tree, as well as latex and latex-like materials from various other sources, has become increasingly important in the past few years. This increased importance is largely attributable to the fact that it has been found possible and extremely convenient to use the latex in the liquid form in many processes in which coagulated or sheet rubber is less adaptable.

Since latex as gathered from the trees consists of approximately 60% water, it is expedient that some step or steps be taken to concentrate the rubber solids content, for it is obviously economically burdensome to transport, from tropical plantations or jungles to the centers of industry, two volumes of water for every volume of rubber solids, if this can be avoided satisfactorily.

The methods heretofore used for concentrating latex have employed evaporation with or without vacuum, creaming, centrifuging, filtration, etc. Concentration, according to the process disclosed in this specification, is accomplished by means of creaming.

It has been known for a considerable time that if certain materials, among which are organic colloidal substances, such as, for example, gum tragacanth, pectin, etc., are added to latex in sufficient amounts, a separation of the latex into at least two portions will occur. One portion will be higher in rubber solids than the other. In such a manner, it is possible to concentrate and purify latex. It has also been customary practice to employ, during the concentration or creaming, a substance which prevents coagulation of the rubber particles. Ammonia is an example of such a substance.

This process of creaming latex is somewhat analogous to the rising of cream on milk, except that in the case of latex there are added to the latex creaming materials which are instrumental in causing the latex to separate after standing, with or without a heat treatment, into two layers, in one of which the proportion of rubber solids is markedly increased, while in the other the serum and water are at a maximum. The two layers may be separated in any suitable manner, such as by centrifuging.

Further, it is well known that different creaming agents react differently with respect to their ability to cream or concentrate latex. Whereas a material, for example, gum tragacanth, may have a relatively short induction period, and give a good separation of the rubber solids from the non-rubber solids, another material may have a longer induction period but may also yield a higher concentration of rubber solids in the cream. Further, those materials which are best adapted to the creaming of latex are not necessarily the least expensive.

I have now discovered that a very satisfactory creaming can be obtained by the use of soluble pectates, as, for example, sodium pectate.

Accordingly, an object of this invention is to disclose and provide novel methods and means whereby the rubber solids may be separated from the non-rubber portion of rubber latex, without coagulation.

Another object of this invention is to disclose and provide novel methods and means of treating latex which will cause the latex to separate into two distinct portions having a definite line of demarcation between them, and will facilitate mechanical separation.

A still further object of this invention is to disclose and provide novel methods and means of producing a latex cream by the addition of a soluble pectate to the latex.

A further object of this invention is to disclose and provide novel methods and means of treating latex with sodium pectate so as to produce a cream high in non-coagulated rubber solids.

Another object of this invention is to disclose and provide novel methods and means of producing a concentrated latex high in rubber solids and capable of being diluted out to the consistency of fresh latex by the addition of a suitable diluent.

All these and other objects and advantages will be apparent from a description of a preferred process embodied in the specification and will present themselves to those skilled in the art in the contemplation and use of this invention.

Since the preferred creaming agent which I propose to use, namely, sodium pectate, is not an article of commerce, I disclose below a suitable method for its production:

Citrus pulp, or peel containing protopectin and which has been rather finely ground, as in a grinder having $\frac{3}{16}$ inch holes, is thoroughly washed with water, after which the water is allowed to drain from the pulp through false bottom tanks, or in any suitable manner. The pulp is then preferably suspended in sufficient water to give a fluid mass.

Soda ash is now added to the pulp with stirring, sufficient alkali being used to make the liquid alkaline to phenolphthalein, enough alkali being added from time to time to insure that the alkalinity is maintained. I have found that approximately 25 lbs. of soda ash will usually be sufficient to maintain the alkalinity in a tank containing 1500 liters of suspended orange pulp. However, for a more acid citrus fruit, a correspondingly larger amount of alkali will be necessary to maintain alkalinity, if the pulp has not been previously well washed. The pulp is left in contact with the soda ash for a period of approximately 12 hours, preferably not above approximately 35° C., after which most of the protopectin will have been converted to the pectate form. Any free liquor is drained off and the pectated pulp is thoroughly washed with water and then allowed to drain.

The pulp is now in a condition to be dewatered. This step may be carried out by centrifuging or by using a hydraulic press, or a continuous expeller, or by any other suitable means. After dewatering, the pulp is ground and then dried suitably in a rotary drier.

The dried pectated pulp may be dispersed in accordance with the following formula:

| | Parts |
|---|---|
| Pectated pulp | 100 |
| Trisodium phosphate | 12 |
| Sodium hydroxide | 1.2 |
| Water (boiling) | 2,000 |

The pactated pulp is preferably added to the boiling water first, with constant agitation. After the pulp has been thoroughly stirred in, the trisodium phosphate may then be added. It is preferable to dissolve the sodium hydroxide in a small amount of water and add this solution to the suspension after the trisodium phosphate has been added. The suspension of pulp should be well agitated for at least 15 minutes. The alkalinity of the dispersion should be tested at intervals with phenolphthalein and if it shows acid to this indicator, more sodium hydroxide should be added in small amounts. The dispersion is now preferably filtered through a suitable filter to remove the pulp particles. The pectate contained in the filtrate may now be precipitated in an approximately equal volume of alcohol. The alcohol is removed from the precipitated pectate by suitable means and the pectate may then be dried at approximately 100° C.

The sodium pectate obtained by the above procedure is of a fibrous character in contrast to the nonfibrous character of pectates made by other procedures.

In general, alkaline pectates, by which term I mean the alkali metal and ammonium compounds, are suitable for the creaming of latex. The fibrous alkaline pectates are decidedly superior to other pectates for this purpose. Of these, I prefer the sodium, potassium, and ammonium compounds.

Where a pectate other than the sodium pectate is to be prepared, it will be understood that suitable compounds of the other alkali will be substituted for the sodium compounds indicated above. For example, in the preparation of ammonium pectate I might substitute ammonium carbonate for the soda ash added to the pulp after grinding. I might also substitute ammonium phosphate and ammonium hydroxide for the trisodium phosphate and sodium hydroxide indicated above as dispersing agents for the pectated pulp. It will be obvious that substitutions of this sort would be necessary where it is desired to obtain a pure ammonium pectate. Mixed pectates will be obtained, otherwise.

In the preparation of, for example, potassium pectate, suitable potassium compounds may be substituted. It is to be understood, furthermore, that other compounds of suitable alkalies may be substituted for the carbonate which, in the above description, is referred to as being added to the freshly ground pulp, for example, phosphates or hydroxides may be substituted. I prefer to employ the carbonates at that point, since these seem to give superior handling qualities to the pectated pulp.

When fibrous sodium pectate is used to cream latex, it is preferably to add it in the form of a solution to the stabilized or fresh latex. A solution of the pectate of suitable concentration is made so that enough pectate solution may be readily added and mixed with the latex, and so that no unnecessary dilution of the latex takes place.

I have found that only a relatively low concentration of fibrous sodium pectate in the latex is necessary to cream latex. This fact has a decided economic value.

I may use the pectated pulp without the filtration and alcohol precipitation which effects separation of the sodium pectate from its cellulosic source material. This does not seem to cause any noticeable detrimental effects. For such use, the pectated pulp is simply dispersed in any suitable way, as, for example, described above, and added directly to the latex in the desired amount.

I have further found that my invention may be carried out with either fresh or stabilized latex. In the specific examples to follow, ammonia stabilized rubber latex is used in illustration of my invention.

In general, my invention may be carried out as follows: A suitable dispersion of fibrous sodium pectate is made up and stirred into the fresh or stabilized latex.

The whole is allowed to stand for a time sufficient to allow the latex cream to show a distinct line of demarcation from the serum. After there seems to be a definite break between the serum and the cream, one may separate the latex cream from the serum in any suitable manner, such as by centrifuging or decanting.

Having now described my invention in its general embodiments, I wish to disclose a preferred and specific method for the creaming of rubber latex.

I first make an aqueous solution of fibrous sodium pectate of such strength that 30 parts will contain approximately 0.11 part of the pectate. This is stirred into the rubber latex in the ratio of 30 parts of pectate sol to 100 parts of latex. The whole is then allowed to stand for a time and at a temperature conducive to good separation of the cream from the serum. I have found that at approximately 25° C. from about 16 to 20 hours is often sufficient time. After the cream has clearly separated from the serum, it may be collected in any suitable manner, depending on whether it is to be used immediately, or put into containers for shipment, etc.

The cream thus obtained may have a rubber solids concentration as high or higher than approximately 50%, and may be transported or used as such, or it may be transported and after transportation it may be diluted to the consistency of fresh latex, or as desired.

In another specific example, I may make a fibrous sodium pectate solution in water so that about 8 parts contain about 0.11 part of the pectate. Eight parts of this solution are stirred into about 100 parts of latex. This mixture is allowed to stand at 60° C. for a time sufficient to produce satisfactory creaming. This creaming goes on at a progressively decreasing rate. The time may be as long as 24 or even 48 hours, or longer. One latex subjected to this particular treatment gave a cream which, at the end of 24 hours, contained about 60% rubber solids. The solids in a cream will, of course, depend upon the age and source of the latex and the treatment to which it has been subjected prior to creaming.

It is to be understood, moreover, that by varying either the conditions or the proportions of the mixtures, or both, numerous variations in results may be obtained. As for example, at higher temperatures and under proper conditions creaming may be completed in about 2 hours. Furthermore, under the proper conditions of treatment it may be possible to obtain as high as about 75-80% concentration of rubber solids in the cream. Again, resort may be had to mechanical means, such as centrifuging, without waiting for completion of the creaming. Likewise, vulcanized latex may be treated in the same manner as the preserved latex used in the illustrative examples above, as may also fresh latex.

I am aware that many modifications will occur to those skilled in the art, and it is not intended that the invention herein disclosed should be limited other than as set forth in the appended claims.

Having thus described my invention in such clear and concise terms as to enable others skilled in the art to follow my process, I claim as my invention and desire to secure by Letters Patent the following:

1. A process for treating latex which comprises treating the latex with fibrous sodium pectate, allowing said latex to cream, removing an aqueous portion therefrom and recovering an uncoagulated concentrated rubber dispersion from said latex.

2. A process for treating rubber latex which comprises treating with fibrous sodium pectate, segregating a rubber containing portion, removing the aqueous portion from said latex and recovering an uncoagulated concentrated rubber dispersion therefrom.

3. A process for concentrating rubber latex which comprises treating with a soluble fibrous alkaline pectate, allowing said latex to cream, removing the aqueous portion from said latex and recovering an uncoagulated concentrated rubber dispersion therefrom.

4. A process for treating latex which comprises treating with a soluble alkaline pectate, segregating a rubber containing portion, removing an aqueous portion from said latex and recovering a concentrated rubber dispersion therefrom.

5. A process for treating rubber latex which comprises treating with a soluble alkaline pectate, allowing said latex to cream, removing an aqueous portion from said latex and recovering an uncoagulated concentrated rubber dispersion therefrom.

6. A process for treating latex which comprises treating with a soluble fibrous alkaline pectate, segregating a rubber containing portion, removing an aqueous portion from said latex and recovering a concentrated rubber dispersion therefrom.

7. A process for treating rubber latex which comprises treating with a fibrous potassium pectate, segregating a rubber containing portion, removing the aqueous portion from said latex and recovering an uncoagulated concentrated rubber dispersion therefrom.

8. A process for treating rubber latex which comprises treating with fibrous ammonium pectate, segregating a rubber containing portion, removing the aqueous portion from said latex and recovering an uncoagulated concentrated rubber dispersion therefrom.

9. A process for concentrating vulcanized rubber latex which comprises treating with a soluble fibrous alkaline pectate, allowing said latex to cream, removing the aqueous portion from said latex and recovering an uncoagulated concentrated vulcanized rubber dispersion therefrom.

10. A process for concentrating vulcanized rubber latex which comprises treating with a fibrous sodium pectate, allowing said latex to cream, removing the aqueous portion from said latex and recovering an uncoagulated concentrated vulcanized rubber dispersion therefrom.

11. A process for treating rubber latex which comprises adding a soluble fibrous alkaline pectate thereto, removing an aqueous portion from said latex and recovering a concentrated rubber dispersion therefrom.

12. As a new product, a concentrated vulcanized latex containing a relatively small amount of a soluble fibrous alkaline pectate.

13. As a new product, a concentrated vulcanized latex containing a relatively small amount of a fibrous sodium pectate.

14. As a new product, a concentrated latex containing a relatively small amount of a soluble alkaline pectate.

15. As a new product, a concentrated latex containing a relatively small amount of a soluble fibrous alkaline pectate.

16. As a new product, a concentrated latex containing a relatively small amount of a fibrous sodium pectate.

17. As a new product, a concentrated latex containing a relatively small amount of a sodium pectate.

CLARENCE W. WILSON.